US 008254288B2

(12) United States Patent
Lindgren et al.

(10) Patent No.: US 8,254,288 B2
(45) Date of Patent: Aug. 28, 2012

(54) METHOD AND AN ARRANGEMENT FOR HANDLING A SERVICE REQUEST IN A MULTIMEDIA NETWORK

(75) Inventors: Anders Lindgren, Älvsjö (SE); Christer Boberg, Tungelsta (SE); Hans Åke Lindgren, Älvsjö (SE); Jan Holm, Gäule (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 378 days.

(21) Appl. No.: 12/520,113

(22) PCT Filed: Dec. 21, 2006

(86) PCT No.: PCT/SE2006/001475
§ 371 (c)(1),
(2), (4) Date: Dec. 1, 2009

(87) PCT Pub. No.: WO2008/076015
PCT Pub. Date: Jun. 26, 2008

(65) Prior Publication Data
US 2010/0111087 A1  May 6, 2010

(51) Int. Cl.
*H04L 12/28* (2006.01)
(52) U.S. Cl. ........ 370/254; 370/328; 370/338; 370/352; 370/389; 455/424; 455/425; 455/432.1; 455/433
(58) Field of Classification Search .............. 370/254, 370/328, 338, 352, 389; 455/424, 425, 432.1, 455/432.2, 433
See application file for complete search history.

(56) References Cited

U.S. PATENT DOCUMENTS

| 7,502,837 | B2* | 3/2009 | Westman et al. ............. 709/219 |
| 7,536,184 | B2* | 5/2009 | Poczo ......................... 455/432.3 |
| 7,583,963 | B2* | 9/2009 | Tammi et al. ............... 455/435.1 |
| 7,590,073 | B2* | 9/2009 | Beckmann et al. ........... 370/254 |
| 7,650,149 | B2* | 1/2010 | Tammi et al. ............... 455/435.2 |
| 7,870,262 | B2* | 1/2011 | Tuohino et al. ................ 709/227 |
| 7,890,101 | B2* | 2/2011 | Yamakawa et al. ........... 455/433 |
| 8,023,485 | B2* | 9/2011 | Shi et al. ...................... 370/338 |
| 8,041,795 | B2* | 10/2011 | Dahlin et al. ................. 709/222 |
| 2006/0174009 | A1* | 8/2006 | Martiquet et al. ............. 709/227 |
| 2006/0270404 | A1* | 11/2006 | Tuohino et al. ............ 455/432.3 |
| 2007/0038723 | A1* | 2/2007 | Gourraud ...................... 709/218 |
| 2007/0072605 | A1* | 3/2007 | Poczo ......................... 455/432.2 |
| 2007/0088836 | A1* | 4/2007 | Tai et al. ....................... 709/227 |
| 2007/0121622 | A1* | 5/2007 | Zhu et al. ...................... 370/389 |
| 2007/0209061 | A1* | 9/2007 | Dekeyzer et al. ................. 726/3 |
| 2007/0232343 | A1* | 10/2007 | Park et al. ...................... 455/518 |
| 2008/0162637 | A1* | 7/2008 | Adamczyk et al. ........... 709/204 |
| 2009/0282236 | A1* | 11/2009 | Hallenstal et al. ............. 713/151 |
| 2010/0046499 | A1* | 2/2010 | Hu et al. ....................... 370/352 |
| 2010/0223339 | A1* | 9/2010 | Cheng et al. ................... 709/206 |
| 2011/0282904 | A1* | 11/2011 | Schaedler et al. ............. 707/769 |

* cited by examiner

*Primary Examiner* — Phirin Sam
*Assistant Examiner* — Andrew C Lee

(57) ABSTRACT

A method and arrangement for handling a service request in a session control unit in a multimedia network. Upon receiving the service request from a user equipment, the session control unit checks a service profile associated with a user-identity of the service request in order to find an application server to which the service request is to be routed. Prior to routing the service request, an ensuring entity ensures the service request will include a primary user-identity. In the application server, the primary user-identity is used to find stored data, which is necessary for executing the requested service.

36 Claims, 4 Drawing Sheets

```
sip:bob.home@x.com
sip:bob.work@x.com
sip:bob.soccer@x.com
tel:+46 8 123 456 78
tel:+46 8 876 543 21
```

METHOD AND AN ARRANGEMENT FOR HANDLING A SERVICE REQUEST IN A MULTIMEDIA NETWORK

TECHNICAL FIELD

The present invention relates generally to an efficient handling of service requests in a multimedia network, and especially to service requests comprising an alias-identity.

BACKGROUND

The IP Multimedia Subsystem (IMS) is an architecture based on the Session Initiation Protocol (SIP) which creates a common platform for enabling a broad range of advanced Internet-based multimedia services and applications on top of a packet switched network.

In FIG. 1 illustrates a conventional procedure in an IMS network for registering a user equipment to the IMS, and for requesting for an IMS-based service. In the figure, only the basic nodes are presented, while any intermediate nodes, which are not affected by the present invention, are, omitted.

Among other functions, a Serving-Call Session Control Function (S-CSCF) node is a SIP server or a session control unit, which handles registration requests received from user equipments registered to the IMS. An S-CSCF node, which has received a request for an IMS-based service from a registered user equipment is responsible for the forwarding of the service request to a specific application server (AS) for further processing of the requested service.

The Home Subscriber Server (HSS) is the main data storage for all subscriber- and service related data of the IMS. The main data stored in the HSS includes a user profile for each user, registered to the IMS. A user profile is a collection of user-specific information that is permanently stored in the HSS. The user profile associated with a user is downloaded to the S-CSCF node upon receiving a request for registering the user to the IMS. The service profile comprises all public user identities, i.e. all identities which may be used when requesting services from the IMS. Public User Identities can be SIP URIs, e.g., bob.home@x.com, or tel URIs, e.g., tel:+46 8 123 456 67. The service profile also comprises trigger rules, which defines under which conditions a service request is to be routed to a specific application server. By checking the trigger rules associated with the user-identity inserted in the service request, the application server to which the service request is to be routed to from the S-CSCF node can be determined.

At the application server, the service request has to be linked to the user data previously stored in the application server and associated with the user identity retrieved from the service request. How this linking is achieved is out of scope of this invention. A well known method for efficiently linking a service request to the appropriate user data is, however, to use a hash function, wherein the user-identity, received in the service request may be used as the hash key.

If required, a user may define a plurality of different user-identities to be linked to the same user profile and the same data, stored in one or more application servers, i.e. identical service requests, having different user-identities, may trigger the same activity. Such alternative user identities are called aliases. An alias may also be used for providing limited access to data associated with another public user-identity.

In a first step 1:1 in FIG. 1, a provisioning system 100 creates all data required for executing services associated with a specific user identity in the HSS 101, including known user-identities, which may include one or more alias-identi-ties. In another step 1:2, the provisioning system also creates the corresponding data, comprising user-identities, required in the associated application server 102. This data also comprises a first user-identity, and, depending on the application server functionality, also known alias-identities.

In another step 1:3, a user wanting to get access to the multimedia services provided by an IMS network register a user equipment 103 by way of sending a SIP register message to the IMS network. The SIP register message is sent to, and evaluated by the S-CSCF node 104, which has been allocated to the user. The S-CSCF node is essentially a SIP server, but it also acts as a registrar, which means that it maintains a binding between the location of a registered user equipment and the user identity associated with the user of the user equipment. When the S-CSCF node receives the register request, an updated user profile related to the user is downloaded to the S-CSCF node from a Home Subscriber Server (HSS) in step 1:4. The user-profile associated with a user comprises a private user identity, which is used for authentication purposes only, and one or more service profiles, each of which is applicable to one or more public user-identities.

After the user equipment has been registered, a request 105 for the desired service is sent to the S-CSCF node in step 1:5. In this case, the user is using alias-identity 1 when requesting for a service. By interrogating the user-identity in the service request in step 1:6, the S-CSCF node determines which trigger rules in the service profile associated with the respective user-identity that are fulfilled, and, thus, which application server to route the service request to for further processing of the requested service.

In another step 1:7, the service request 105, comprising the alias-identity 1 is routed to the application server, pointed to by the respective trigger rules.

In a final step 1:8, an appropriate data model is used for linking the user-identity, retrieved from the service request to the data associated with the respective user-identity. Such a linking procedure may be both complicated and resource consuming.

FIG. 2 illustrates an example of different user-identities, including alias-identities, associated with a user. The first user-identity, i.e. bob.home@x.com is defined as a first user-identity, which for example may give full access to the user data associated with the respective user, while the additional user-identities i.e. bob.work@x.com and bob.soccer@x.com may also give full or limited access to the respective user data, according to the trigger rules set up for the respective user-identity or alias-identity.

One problem with existing solutions is that the provisioning of an application server becomes complicated if the application server must be able to understand an alias-identity in a service request.

Another problem is that the data model of the application server, as well as the routing of requests becomes complicated if the application servers must be able to interpret and understand an incoming alias.

Yet another problem is that there are cases when it is required that all nodes in the IMS network share similar data models. This causes increased complexity when upgrading of the IMS network is necessary.

A requirement for extra database requests and more logic to be executed in the application server, are other problems which are connected with the handling of alias-identities.

SUMMARY

The object of the present invention is to address at least some of the problems outlined above. In particular, it is an object of the present invention to provide a solution which can simplify the handling of service requests, and especially service requests comprising an alias-identity in the session control functions, and in the application servers of a multimedia network.

These objects and others may be obtained by providing a method and arrangement, respectively, according to the attached claims. According to one aspect, a method is provided for handling a service request in a session control unit in a multimedia network.

In this inventive method, a service request comprising a user-identity, is sent from a user equipment, and received in a call session control function. The call session control function may be a serving-call session control function an XML configuration access protocol aggregation proxy. A service profile associated with the user-identity of the service request is checked in order to find the application server to send said service request to. The method also disclose a step wherein it is ensured that said service request comprises a primary user-identity, before the request is routed to the application server.

In the application server the primary user-identity is used for finding stored data, which is necessary for executing said requested service.

The primary user-identity may be inserted in the service request, after having determined whether the service request already includes the primary user-identity. Alternatively, the primary ser-identity may be inserted without having executed any determination or checking at all.

In the determination step, the primary user-identity may be retrieved from a new primary user-identity header or the first user-identity position of the service profile. The user-identity of the service request may be retrieved from the Request-URI or from the P-Asserted Identity.

The primary user-identity may be inserted into a new primary user-identity header, or into the route header of the service profile. Inserting the primary user-identity into the service profile may also be executed simply by replacing the alias-identity in the service request with the primary user-identity. Furthermore, in the application server, a service request, comprising the primary user-identity will provide immediate access to the data necessary for executing the requested service.

According to another aspect, an arrangement is provided for handling service requests in a session control unit. This inventive arrangement comprises means for receiving a service request, comprising a user-identity, from a user equipment. The arrangement further comprises means for checking a service profile associated with the user-identity, in order to find the application server to route the service request to. Ensuring means is adapted for ensuring that the service request comprises a primary user-identity, before the service request is routed to the application server via a routing means.

According to another aspect, an application server is provided for executing a service indicated by a service request, received from the session control unit. The application server comprises means which is adapted to provide immediate access to the stored data, necessary for executing the requested service, by reading the primary user-identity.

According to yet another aspect, a home subscriber server is provided for forwarding a service profile to the session control unit. The home subscriber server comprises means for defining the first user-identity in the service profile as the primary user-identity. Alternatively, the respective primary user-identity is inserted into a new primary user-identity header in the service profile.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention provides a solution where the data model and the provisioning of a HSS and application servers of an IMS network is simplified, and where the performance for the handling of service requests is improved, especially considering memory requirements and latency.

Figures 1, 2:
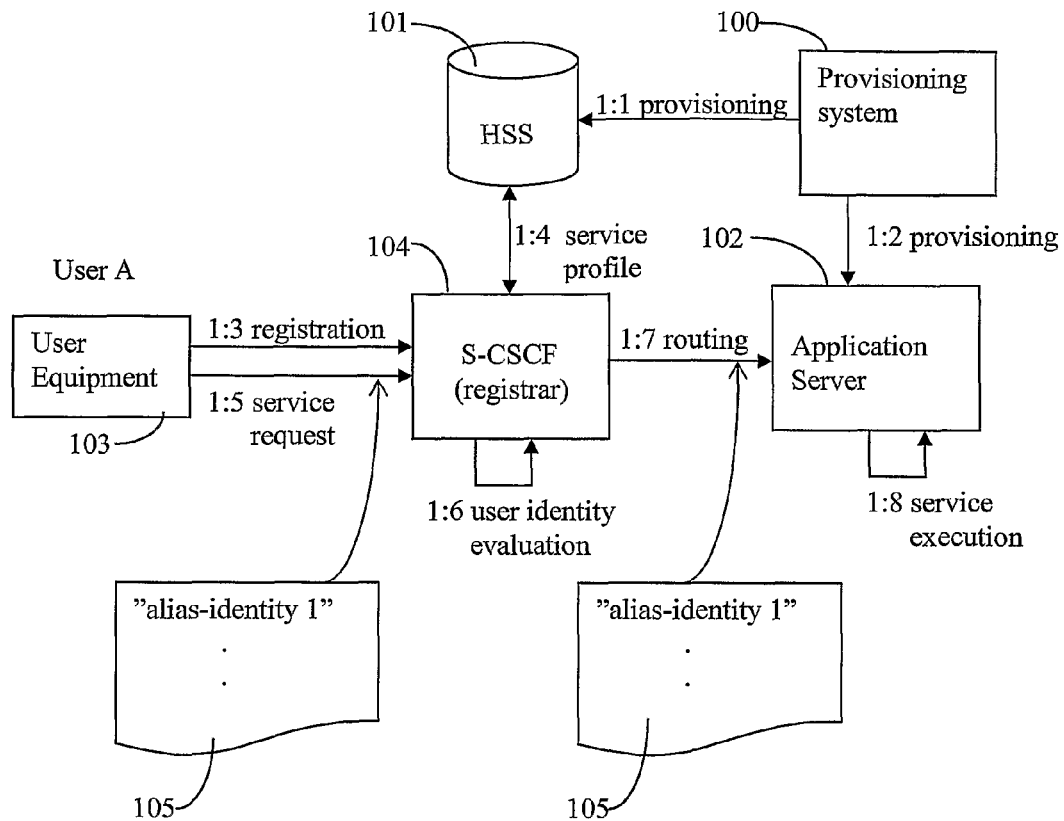
FIG. 1 is schematic block diagram illustrating a conventional procedure for registering a user equipment to the IMS, and for requesting for an IMS-based service, according to the prior art.
FIG. 2 is a table illustrating an example of user identities, which can be associated with a user, registered to the IMS.
Figure 3:
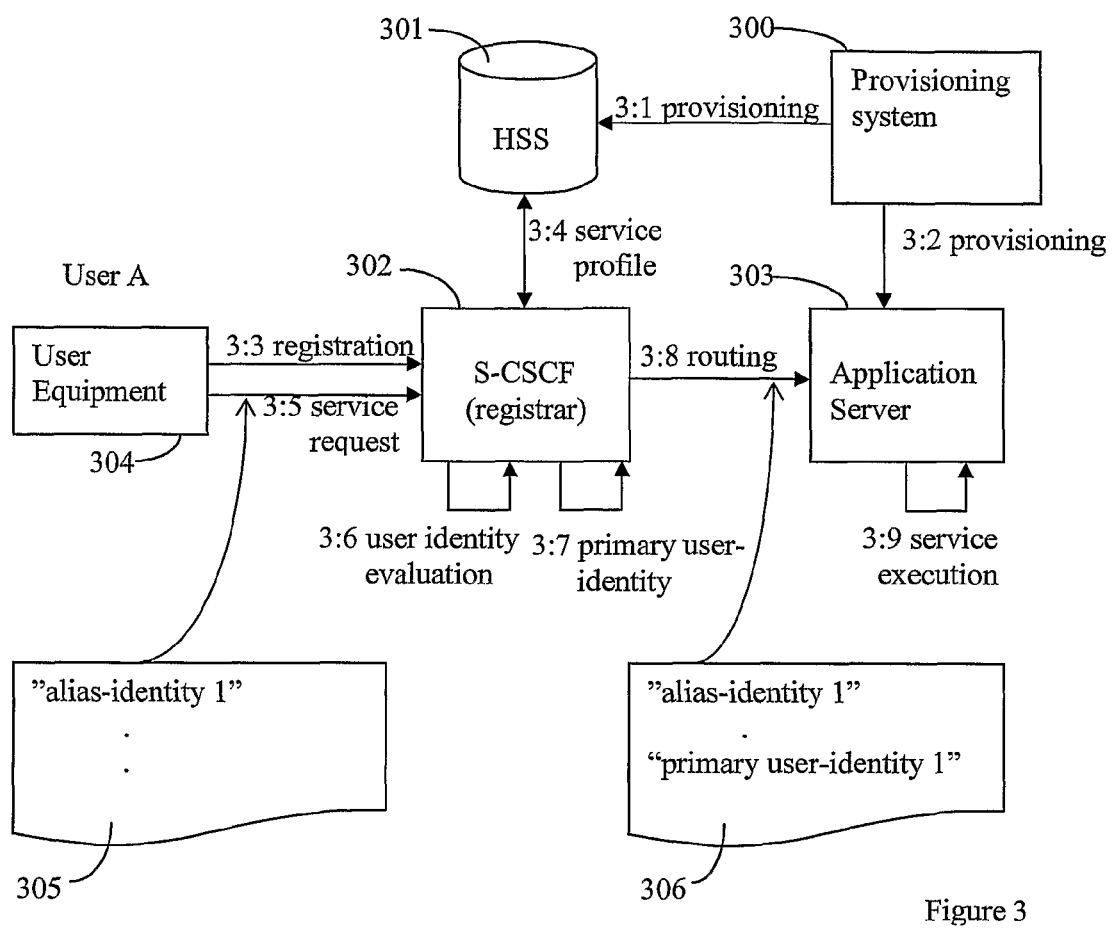
FIG. 3 is a schematic block diagram illustrating a procedure for handling a service request for an IMS-based service, in accordance with one embodiment.

FIG. 3 illustrates a first embodiment of handling a service request in an IMS. In a first step 3:1, a provisioning system 300 creates all required data, including a user-identity, which is defined as the primary user-identity, and any known alias-identity, and forwards this data to the HSS 301. The provisioning procedure can be initiated by a user, requesting a service provider, not shown, connected to the provisioning system, to allocate an alias-identity to a user-identity, denoted the primary user-identity. The primary user-identity is a user-identity with a specific set of services connected to it, which will exist as long as the user is subscribing to the respective service set. If the primary user identity is removed, also the respective set of services will be removed, together with all associated alias-identities.

In one embodiment, the first user-identity stored in the service profile is always defined as the primary user identity. An implementation of this embodiment will not require any modifications in the HSS. In addition, since the primary user identity is located in an already existing data field, this embodiment only will require small changes in the S-CSCF.

In an alternative embodiment, a new primary user identity field, dedicated for the primary user-identity, is created in the service profile. An introduction of a new field into the service profile, however, requires changes in the HSS, which has to be able to handle the insertion of the primary user-identity into the new field during provisioning, and in the S-CSCF node 302, which has to be able to identify the primary user-identity from other user-identities, stored in the service profile.

It is to be understood that the invention is not limited to the handling of service requests in an S-CSCF, but can be implemented also in other session control units. One alternative scenario may disclose the handling of data, stored in XML format. Such a scenario may be handled by using the XML Configuration Access Protocol (XCAP) for handling requests in an XCAP Aggregation Proxy (XCAP AP), and by adapting the XCAP AP according to any of the embodiments described for a S-CSCF.

In another step 3:2, the provisioning system also forwards data, associated with the respective user-identity, to the respective application server 303, dedicated for executing the services associated with the respective user-identity. The provisioning system may include all available alias-identities in the data forwarded to the respective application server as an option. For the purpose of executing the present invention, however, forwarding of alias-identities to the application server during the provisioning process is not necessary.

In step 3:3, user A, register a user equipment 304, to the IMS by way of forwarding a request for registration (SIP REGISTER) from the respective user equipment to the S-CSCF node, operating as a registrar. The registration request comprises a user-identity, which may be the primary user-identity, e.g. bob.home@x.com, or an alias-identity, e.g. bob.soccer@x.com, which may define an alternative user-identity.

In response to the registration request, the S-CSCF node requests and retrieves an updated service profile for user A from HSS. This is illustrated in step 3:4. The service profile comprises the primary user-identity, and all alias-identities, if any, which have been provisioned for user A.

In a next step, user A, having registered the user equipment to the IMS, wants to subscribe for a service associated with a specific user-identity. A service request 305, e.g. SIP SUBSCRIBE, in this case including an alias-identity, i.e. alias-identity 1, is therefore forwarded to the S-CSCF node in step 3:5. In order for the S-CSCF node to determine which application server to forward the service request to, the service profile associated with the user-identity of the service request is checked in step 3:6. The trigger rules of the service profile specifies under which conditions the respective application server is to be selected for routing of the service request, and for execution of the requested service.

Before the service request is routed to the respective application server, a novel step 3:7, having the purpose of ensuring that the service request comprises a primary user-identity, is executed. A number of alternative embodiments for executing this step will now be presented.

In a first embodiment, the primary user-identity is always inserted in the respective service request. In accordance with this embodiment no checking whether the service request is including the primary user-identity or an alias-identity upon arriving at the S-CSCF is necessary. No matter which user-identity is used in the service request, the primary user-identity will always be inserted in the service request.

In an alternative embodiment, the S-CSCF node may always translate an alias-identity of a service request to the respective primary user-identity, and replace the alias-identity with the primary user identity in the service request. Since no alias-identity will be included in the service request, this embodiment may be an alternative only in cases where the respective application server does not need the alias-identity for the execution of the respective service request.

In yet another embodiment, S-CSCF compares the content of a specific field or header in a service request. By comparing the content of the respective field or header with the primary user-identity in the respective service profile, it is determined whether said primary user-identity have to be implemented into a header of the service request or not. If the primary user-identity is found to be already in the service request, the service request can remain unchanged, and be routed to the respective application server. Which header to choose to check in the comparison procedure may differ depending on an originating or a terminating case. In a terminating case, the Request-URI which can be a SIP URI, a secure SIP (SIPS) URI or a TEL URI, may be checked, while the P-Asserted-Identity header may be checked in an originating case.

The primary user-identity may be inserted into a new header in the service request. In an alternative embodiment, the already existing route header may be used for this purpose. This could be illustrated in the following way:
SIP:sipas1@x.com, sessioncase=originating; primaryuseerid=sip:bob.home@x.com
Wherein sipas1@x.com is the sip address of the application server that shall execute the service, while bob.home@x.com is the primary user identity. In this example sessioncase is defined as an originating session, which indicates that it is the P-asserted-identity that holds information as to which application server the S-CSCF shall route the service request to. By implementing this embodiment, no specific measures have to be taken in the S-CSCF node, since the primary user identity is always included in an already existing header, which is already checked in present systems when interrogating to which application server to route an incoming service request to.

In step 3:8, the modified service request 306, including an alias-identity, i.e. alias-identity 1, and now also completed with the primary user-identity, primer user-identity 1, associated with the alias-identity, is routed to the respective application server for execution of the requested service.

A final step 3:9 illustrates an internal service execution process, which is executed in the application server. In this step, the user-identity, i.e. the primary user-identity is identified and used for linking the service request to the data associated with the primary user-identity, as well as the alias-identity of the service request. By using the primary user-identity, handling of service requests in the application servers will be improved and simplified. Most important, by using the proposed primary user-identity, immediate access to the respective data will be achieved, and, thus, no interpretation of the alias-identity in the incoming service request will be required.

It should be noted that a plurality of application servers may be involved in the process of executing the requested service. In that case, the service request may be routed between these application servers, according to user data identified via the primary user-identity and, if used, the alias-identity in the service request.

Figure 4:
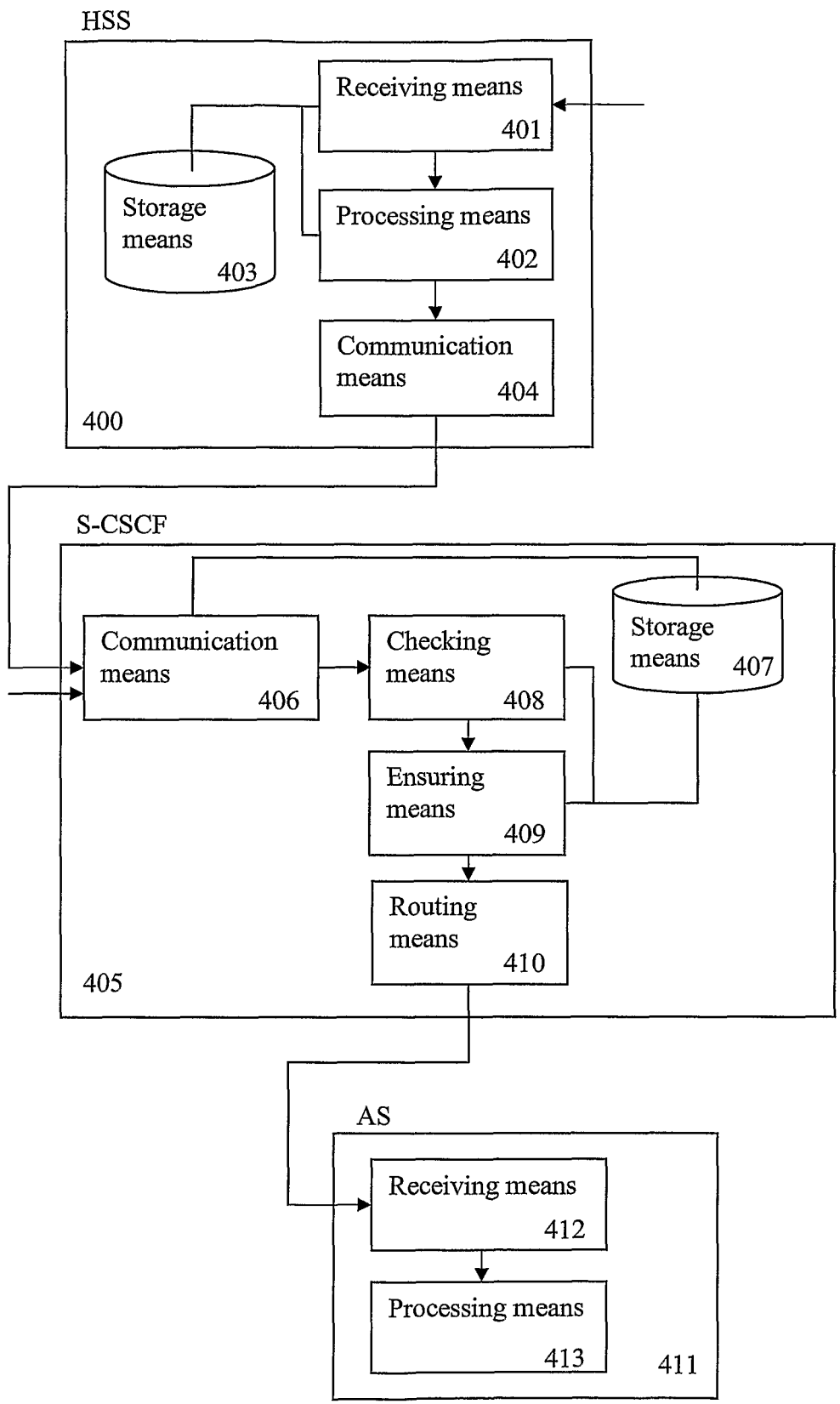
FIG. 4 is a schematic, high-level block diagram illustrating the basic functions of the nodes which have been described with reference to FIG. 3.

A high-level block diagram of the invention is shown in FIG. 4. The figure shows a HSS 400, comprising a receiving means 401, which can receive user data associated with a specific user-identity from a provisioning system, not shown. The user data is then processed in a processing means 402, wherein a service profile associated with the respective user-identity will be updated and stored in the storage means 403. Upon receiving a request for downloading of an updated version of the respective service profile, a communication means 404, comprising a transmitting means and a receiving means, downloads the service profile to the S-CSCF 405. In the S-CSCF, a communication means 406, comprising a receiving and a transmitting means, receives the service profile and store it in a storage means 407. A service request can be activated at a user equipment, not shown, by a user using a preferred user-identity, wherein the service request is sent to the S-CSCF, dedicated to the user equipment, and received at the communication means of the S-CSCF. The service request is sent to a checking means 408, wherein the trigger rules of the service profile associated with the user-identity of the service request is checked in order to find the AS to route the service request to. Before the service request is routed to the respective AS, the service request is sent to an ensuring means 409. In the ensuring means, a process is initiated for ensuring that a primary user-identity, associated with the user-identity of the service request, is included in the service request. Some alternative ways of executing the processing in the ensuring means have been described earlier with reference to step 3:7 in FIG. 3. The ensuring means may comprise means for inserting the primary user-identity without executing any comparison procedure, and/or means for comparing a specified field or header with the user-identity of the received service request. Alternatively, the ensuring means may comprise means which is adapted to insert the primary user-identity in a new header field, dedicated for this purpose, or an already existing header field. The service request, completed with a primary user-identity, can then be routed to the respective AS via a routing means 410. At the AS 411, the service request is received by a receiving means 412, and forwarded to a processing means 413 for linking of the service request to the relevant data, and for processing of the requested service.

Figure 5:
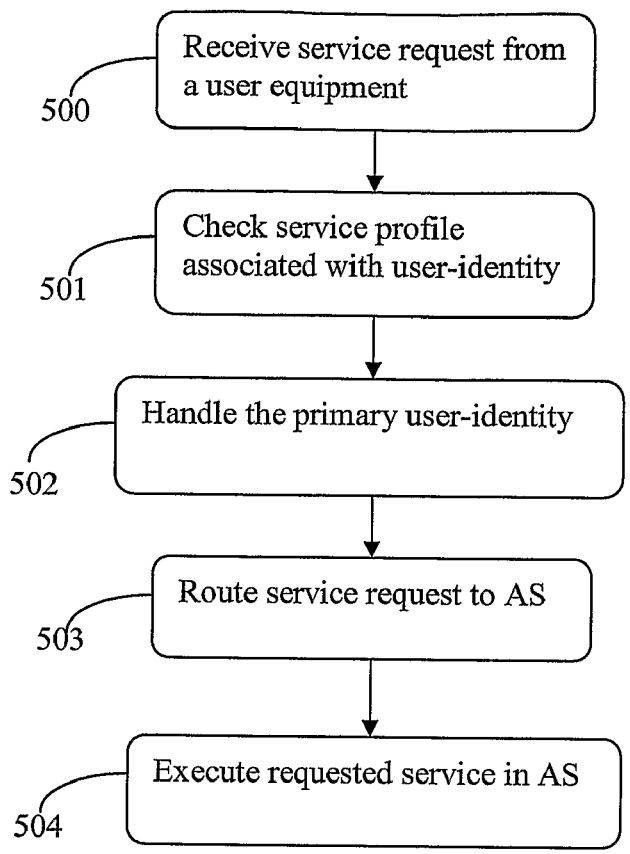
FIG. 5 is a flow chart illustrating a basic procedure for handling a service request in accordance with the embodiment described with reference to FIG. 3.

FIG. 5 is a flow chart showing the general steps for handling a service request according to the basic principle of the invention. In a first step 500, a service request, sent from a user equipment is received in a session control unit, e.g. an S-CSCF. In a next step 501, a check is executed against the service profile associated with the user-identity of the service request. The check results in the determining as to which AS the service request is to be routed to. In a next step 502, a procedure for handling a primary user-identity ensures that the service request will comprise the respective primary user-identity, before it is routed to the respective application server in step 503. One embodiment for handling the primary user-identity can be to always insert the primary user-identity into the received service request, without requiring any evaluation of the original content in the user-identity. An alternative embodiment of handling the primary user-identity will be described below, with reference to FIG. 6. In a final step 504, the requested service is executed in the application server to which the service request has been routed. In the final execution step, which takes place in the application server, the primary user-identity provides immediate access to the data, which is necessary for executing the requested service.

Finally, an alternative embodiment for handling the primary user-identity, described above, with reference to step 503 in FIG. 5, will now be described with reference to the flow chart in FIG. 6.

Figure 6:
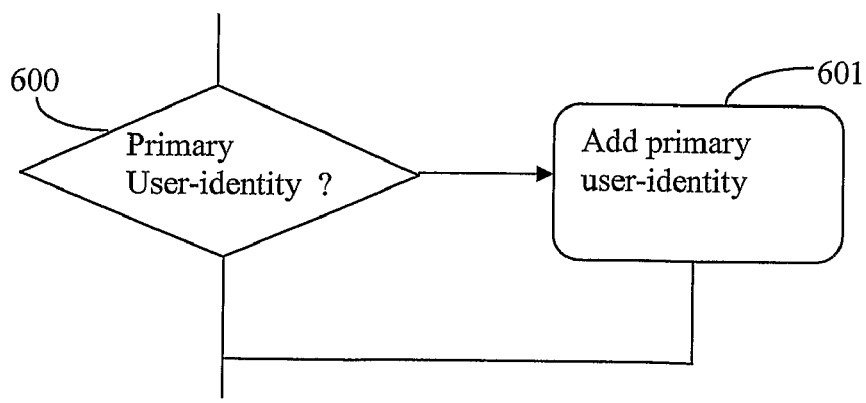
FIG. 6 is a flow chart illustrating an alternative embodiment of the procedure described in step 502 of FIG. 5.

In FIG. 6 it is determined, whether, upon arriving at the session control unit, the received service request comprises the primary user-identity, identified from the corresponding service profile, or not. The checking of the user-identity of the received service request, as well as the insertion of the primary user-identity into the service request may be done in a number of alternative ways, which have been described above, with reference to step 3:7 in FIG. 3.

By introducing the described straightforward routing procedure, the data model, as well as the internal logic of the application servers, can be simplified, while the performance of the application servers can be improved, compared to systems available today.

While the invention has been described with reference to specific exemplary embodiments, it is to be understood that the invention is not limited to the disclosed exemplary embodiments. The description is generally only intended to illustrate the inventive concept and should not be taken as limiting the scope of the invention, which is defined by the appended claims. The scope of the following claims is to be accorded the broadest interpretation as to encompass all such modifications and equivalent structures and functions.

The invention claimed is:

1. A method of handling a service request in a session control unit in a multimedia network, the method comprising the steps of:
    a) receiving by the session control unit, a registration request that includes either a primary user-identity or an alias-identity for the user equipment;
    b) retrieving by the session control unit, an updated service profile associated with the primary user-identity or the alias-identity received in the registration request, wherein the updated service profile is retrieved from a Home Subscriber Server(HSS) and includes the primary user-identity and the alias-identity that have been provisioned for the user equipment;
    c) receiving from the user equipment, a service request for a service associated with the primary user-identity, the service request including either the primary user-identity or the alias-identity for the user equipment;
    d) checking the service profile associated with the primary user-identity or the alias-identity received in the service request to find an application server to which the service request is to be routed;
    e) ensuring that the service request includes the primary user-identity, wherein when the service request includes the alias-identity, the session control unit inserts the primary user-identity into the service request; and
    f) routing the service request with the primary user-identity to the application server, wherein the application server utilizes the primary user-identity to find stored data necessary for executing the requested service.

2. The method according to claim 1, wherein the service profile includes trigger rules specifying conditions under which the service request is to be forwarded to the application server.

3. The method according to claim 1, wherein step e) includes verifying that the service request received from the user equipment includes the primary user-identity before the service request is sent to the application server.

4. The method according to claim 3, wherein the verifying step includes determining whether the service request includes the primary user-identity or the alias-identity.

5. The method according to claim 4, wherein the determining step includes comparing a header of the service request with the primary user-identity stored in a service profile received from a Home Subscriber Server (HSS).

6. The method according to claim 5, wherein the primary user-identity is stored in a new primary user-identity header of the service profile.

7. The method according to claim 5, wherein the primary user-identity is stored in the first user-identity position of the service profile.

8. The method according to claim 5, wherein the determining step includes comparing a P-Asserted Identity of the service request with the primary user-identity stored in the service profile.

9. The method according to claim 5, wherein the determining step includes comparing a Request-URI of the service request with the primary user-identity stored in the service profile.

10. The method according to claim 9, wherein if the comparing step results in a mismatch, the primary user-identity is inserted into the service request.

11. The method according to claim 9, wherein if the comparing step results in a match, the service request remains unchanged.

12. The method according to claim 1, wherein step e) includes inserting the primary user-identity into a new primary user-identity header of the service request.

13. The method according to claim 1, wherein step e) includes inserting the primary user-identity into a route header of the service request.

14. The method according to claim 1, wherein if the service request includes the alias-identity, step e) includes replacing the alias-identity with the primary user-identity of the service request.

15. The method according to claim 1, wherein step f) is performed according to trigger rules contained in the service profile.

16. The method according to claim 1, further comprising utilizing the primary user identity in the application server to obtain immediate access to the stored data.

17. The method according to claim 1, further comprising executing the requested service in the application server on the basis of the primary user-identity and the alias-identity, when included in the service request.

18. The method according to claim 1, wherein the session control unit is a Serving-Call Session Control Function (S-CSCF).

19. The method according to claim 1, wherein the session control unit is an XML Configuration Access Protocol Aggregation Proxy (XCAP AP).

20. An arrangement for handling a service request in a session control unit in a multimedia network, the arrangement comprising:
   means for receiving from a user equipment, a registration request that includes either a primary user-identity or an alias-identity for the user equipment; and
   means for retrieving an updated service profile associated with the primary user-identity or the alias-identity received in the registration request, wherein the updated service profile is retrieved from a Home Subscriber Server (HSS) and includes the primary user-identity and the alias-identity that have been provisioned for the user equipment;
   means for receiving from the user equipment; a service request for a service associated with the primary user-identity, the service request including either the primary user-identity or the alias-identity for the user equipment;
   means for checking the service profile associated with the primary user-identity or the alias-identity received the service request to find an application server to which the service request is to be routed;
   means for ensuring that the service request includes the primary user-identity, wherein when the service request includes the alias-identity the ensuring means inserts the primary user-identity into the service request; and
   means for routing the service request with the primary user-identity to the application server, wherein the application server utilizes the primary user-identity to find stored data necessary for executing the requested service.

21. The arrangement according to claim 20, wherein the service profile includes trigger rules specifying conditions under which the service request is to be forwarded to the application server.

22. The arrangement according to claim 20, wherein the ensuring means includes means for verifying that the service request includes the primary user-identity before the service request is sent to the application server.

23. The arrangement according to claim 20, wherein the ensuring means includes means for determining whether the service request includes the primary user-identity or the alias-identity.

24. The arrangement according to claim 23, wherein the ensuring means includes means for comparing a header of the service request with the primary user-identity stored in a service profile received from a Home Subscriber Server (HSS).

25. The arrangement according to claim 24, wherein the ensuring means includes means for retrieving the primary user-identity from a new primary user-identity header in the service profile.

26. The arrangement according to claim 23, wherein the ensuring means includes means for retrieving the primary user-identity from a first user-identity position in the service profile.

27. The arrangement according to claim 26, wherein the ensuring means includes means for comparing a P-Asserted-Identity of the service request with the primary user-identity stored in the service profile.

28. The arrangement according to claim 26, wherein the ensuring means inserts the primary user-identity into a new primary user-identity header of the service request.

29. The arrangement according to claim 26, wherein the ensuring means inserts the primary user-identity into a route header of the service request.

30. The arrangement according to claim 26, wherein the ensuring means includes means for replacing the alias-identity with the primary user-identity in the service request.

31. The arrangement according to claim 26, wherein the ensuring means includes means for comparing a Request-URI of the service request with the primary user-identity stored in the service profile.

32. The arrangement according to claim 31, wherein the ensuring means inserts the primary user-identity into the service request if the comparing results in a mismatch.

33. The arrangement according to claim 31, wherein the ensuring means routes the service request unchanged if the comparing results in a match.

34. The arrangement according to claim 20, wherein the routing means includes means for routing the service request according to trigger rules contained in a service profile received from a Home Subscriber Server (HSS).

35. The arrangement according to claim 20, wherein the session control unit is a Serving-Call Session Control Function (S-CSCF).

36. The arrangement according to claim 20, wherein the session control unit is an XML Configuration Access Protocol Aggregation Proxy (XCAP AP).

* * * * *